United States Patent [19]

Kristjánsdóttir et al.

[11] Patent Number: 5,484,470
[45] Date of Patent: Jan. 16, 1996

[54] ENHANCEMENT OF GOLD LIXIVIATION USING NITROGEN AND SULFUR HETEROCYCLIC AROMATIC COMPOUNDS

[75] Inventors: Sigrídur S. Kristjánsdóttir; Jeffery S. Thompson, both of Wilmington, Del.

[73] Assignee: E. I. Du Pont de Nemours and Company, Wilmington, Del.

[21] Appl. No.: 281,966

[22] Filed: Jul. 28, 1994

[51] Int. Cl.⁶ .................................................. C22B 11/08
[52] U.S. Cl. .................. 75/722; 75/721; 75/723; 502/20
[58] Field of Search ............. 75/721–723; 423/DIG. 14; 502/20

[56] References Cited

U.S. PATENT DOCUMENTS

| | | | |
|---|---|---|---|
| 3,597,290 | 8/1971 | Nalto et al. | 156/18 |
| 4,654,145 | 3/1987 | Demopoulos | 210/638 |
| 4,675,172 | 6/1987 | Quan | 423/DIG. 14 |
| 4,696,801 | 9/1987 | Devonalel | 423/DIG. 14 |
| 4,724,129 | 2/1988 | Helgorsky | 75/722 |
| 4,997,532 | 3/1991 | Flax | 204/105 |
| 5,131,943 | 7/1992 | Allison | 75/426 |
| 5,169,503 | 12/1992 | Baughmann | 204/105 |
| 5,182,026 | 1/1993 | Pike | 423/DIG. 14 |
| 5,213,777 | 5/1993 | Dalton | 423/DIG. 14 |
| 5,250,272 | 10/1993 | Knorre | 423/31 |
| 5,256,187 | 10/1993 | Gefvert | 75/17 |

FOREIGN PATENT DOCUMENTS

| | | |
|---|---|---|
| 0358004 | 3/1990 | European Pat. Off. . |
| 60184647 | 2/1986 | Japan . |
| 01111824 | 7/1989 | Japan . |
| 130801 | 4/1981 | Poland ............... C22B 15/00 |

OTHER PUBLICATIONS

Amsterdam, NL, "Dissolution kinetics of gold in iodide solutions", *Hydrometallurgy*, vol. 27, 1991, pp. 47–62.
Hiskey, J. B., et al., *Mineral Processing & Extractive Mettalurgy Review*, 4, 95–134, 1988.
Zhang, Z., et al., *Huaxue Shiji*, 137–139, 1982.
Iqbal, M., et al., *Radiochim. Acta.*, 22, 37–39, 1975.
Abstract: U.S. Pat. No. 4,654,145.
Abstract: Japan 01111824.

*Primary Examiner*—Peter D. Rosenberg
*Attorney, Agent, or Firm*—Kathleen W. Geiger; George A. Frank

[57] ABSTRACT

An improved process for dissolving gold metal in ligand and oxidant lixiviation systems, wherein the solubility of gold is enhanced by the addition of heterocyclic aromatic compounds containing nitrogen or sulfur in the ring.

22 Claims, 4 Drawing Sheets

ENHANCEMENT OF GOLD LIXIVIATION USING NITROGEN AND SULFUR HETEROCYCLIC AROMATIC COMPOUNDS

FIELD OF THE INVENTION

This invention relates to improvements in the field of dissolving gold metal using a lixiviant solution, and particularly to hydrometallurgical extraction of gold from ores and to other operations that require a solution of gold metal. More specifically, it relates to the field of lixiviation of gold wherein a ligand and oxidant are used for lixiviation, by adding heterocyclic aromatic compounds containing nitrogen or sulfur in the ring as activators for the dissolution step.

TECHNICAL BACKGROUND

Many operations require the dissolution of gold, for example the isolation of gold metal from ores containing small amounts of the metal, the recovery of gold from gold plated materials, and the preparation of soluble gold metal compounds for applications such as catalyst manufacture. However, gold metal is notable for its resistance to dissolution and chemical reaction. For example, gold will dissolve in an aqueous solution only if the solution contains a good ligand or bonding agent for gold plus an oxidizing agent, neither ingredient alone being sufficient. This combination of ligand and oxidant is referred to as a lixiviant system.

For gold, a number of lixiviant systems have been proposed and used over the past century, primarily for mining applications. The most widely used system is a combination of sodium cyanide as ligand together with air (oxygen) as oxidant, primarily because of economy and process simplicity. Other ligand/oxidant systems of importance are thiourea and thiocyanate with ferric ion; sodium thiosulfate with air, copper(II) sulfate and ammonia; sodium chloride with sodium hypochlorite; sodium bromide with bromine; and a number of other systems. The chemistry of these and other alternative lixiviant systems is described in a review article by J. B. Hiskey and V. P. Atluri, *Mineral Processing and Extractive Metallurgy Review*, 4, 95–134 (1988). The choice of a particular lixiviant system depends on a variety of factors including ingredient cost, safety, environmental concerns, and corrosion of equipment. For mining operations, the ease of separating the impurities associated with gold in the ore is frequently the primary factor in choosing one particular lixiviant system over another.

Certain divalent metal cations such as lead, mercury, thallium and bismuth are known to accelerate gold dissolution in cyanide solutions. The mechanism of this action is not known, although depolarization of the gold surface and prevention of passivation of the gold surface have been suggested. The use of these metals is undesirable. If they are recovered with the gold, expensive purification steps for the gold may then be required. If any portion of these highly toxic metal ions becomes trapped with the tailings from the ore processing, they create a severe, long-lasting environmental risk.

An improvement to any of the generally used lixiviant systems would have high value, particularly if it were broadly applicable to a wide variety of these systems. This improvement could result in a higher yield of dissolved gold under standard dissolution conditions, a shorter time cycle for this step, less severe operating conditions, the use of smaller amounts of lixiviant ingredients, or in still other ways which reduce cost, improve safety, or increase gold recovery. The prior art does not disclose a method of enhancing the operation of the generally used lixiviant systems without the use of poisonous metal compounds, nor one that is broadly applicable.

U.S. Pat. No. 3,597,290 discloses a method of chemically dissolving metals and particularly describes the etching of copper with acidified hydrogen peroxide. The method uses a solution containing a strong organic acid or a mineral acid (excluding hydrohalic acids) plus hydrogen peroxide and a saturated lower aliphatic alcohol. Optionally, this system may contain a catalytic amount of the salt of a metal with a lower oxidation potential than the metal being dissolved to enhance the latter's dissolution, the catalytic materials including the salts of metals such as silver, mercury, palladium, gold, and platinum. Optionally, this system may also contain a nitrogen compound having at least one bonding site to copper, such as urea, pyridine, amines and acid amides. In contrast to the present invention, the '290 patent does not teach a method of enhancing the dissolution of gold or other metals, but rather proposes the use of catalytic amounts of certain noble metal salts to enhance the dissolution of other metals with a higher oxidation potential such as copper. The nitrogen compounds mentioned are optional rather than essential, and are utilized as bonding agents to copper to inhibit the undercutting of the copper during a selective etching process.

Polish Patent PL 130,801 discloses a process for the recovery of silver and copper from sulfidic ores by using a mixture of pyridine and its hydrochloride to dissolve the minerals containing these metal ions, filtering off the inert material, adding water, extracting with chloroform to remove the silver chloride and pyridine, and recovering the copper from the aqueous phase by electrolysis. This process is similar to many examples in the literature in which nitrogen heterocyclic compounds are used to extract metal complexes into an organic solvent. The '801 patent does not teach a method to enhance the operation of a gold lixiviant system containing a ligand and oxidant by adding catalytic amounts of an aromatic heterocyclic compound containing nitrogen or sulfur in the ring. Rather it teaches the use of large amounts of pyridine and pyridine hydrochloride to dissolve silver and copper sulfide ores and effect the separation of copper from silver ions by extraction of the silver and pyridine into a chloroform solution.

U.S. Pat. No. 5,169,503 discloses a process for extracting metal values from ores using a lixiviant system comprising a chloride salt, a hypochlorite salt and optionally cyanuric acid, a nitrogen-containing heterocyclic compound. The cyanuric acid is used to prolong the life of the hypochlorite solution under acidic conditions, even though it is stated to actually decrease the reaction rate between the metals being dissolved and the chlorine-containing compounds.

Numerous examples in the literature disclose the use of nitrogen-containing heterocyclic aromatic compounds in combination with soluble gold compounds for a variety of purposes. U.S. Pat. No. 4,654,145, Japanese Patent 01111824; Z. Zhang and W. Gan, *Huaxue Shiji*, 137–139 (1982); and M. Iqbal and M. Ejaz, *Radiochim. Acta*, 22, 37–39 (1975). For example, a common application is the recovery of gold from aqueous solutions of their salts by solvent extraction. These nitrogen-containing aromatic heterocyclic compounds are also used in the preparation of resins to sequester soluble metal species from solution and are often used to improve electrodeposition of gold by allowing the use of a high current density without loss of current efficiency. In all these applications, the heterocyclic aromatic compounds are reacting with soluble metal ions and play no role in the dissolution of the metal; in fact in the case of electrodeposition the process is just the reverse, removing the metal from its solution.

Accordingly, there is a need for a method to enhance the operation of lixiviant systems for the dissolution of gold metal that will increase the speed of dissolution, allow greater metal recovery, use less chemicals or allow the use of Milder conditions. In particular, there is a need for a catalytic method of enhancing such lixiviant systems which is broadly applicable to a number of systems and which does not require the use of poisonous metal salts.

SUMMARY OF THE INVENTION

This invention provides an improvement in the process for lixiviation of gold metal in systems using a ligand and an oxidant. The improvement comprises adding catalytic amounts of optionally substituted heterocyclic aromatic compounds containing nitrogen or sulfur in the ring, provided that in such heterocyclic compounds the sulfur and/or nitrogen heteroatom and the heterocyclic ring are available for coordination to the surface of the undissolved gold metal.

Traditional gold lixiviation systems employ an oxidant to first convert gold metal to gold ion and a ligand which coordinates to the resulting gold ion. In the improved system of the invention, a nitrogen and/or sulfur aromatic heterocycle is added which acts to promote the dissolution of gold at faster rates or under milder conditions than without them. The resulting gold complex is comprised of an oxidized metal ion coordinated to the added ligand and possibly solvent molecules; the aromatic heterocyclic compound is not part of the metal coordination sphere and is not consumed in the process.

DETAILED DESCRIPTION OF THE INVENTION

Figure 1:
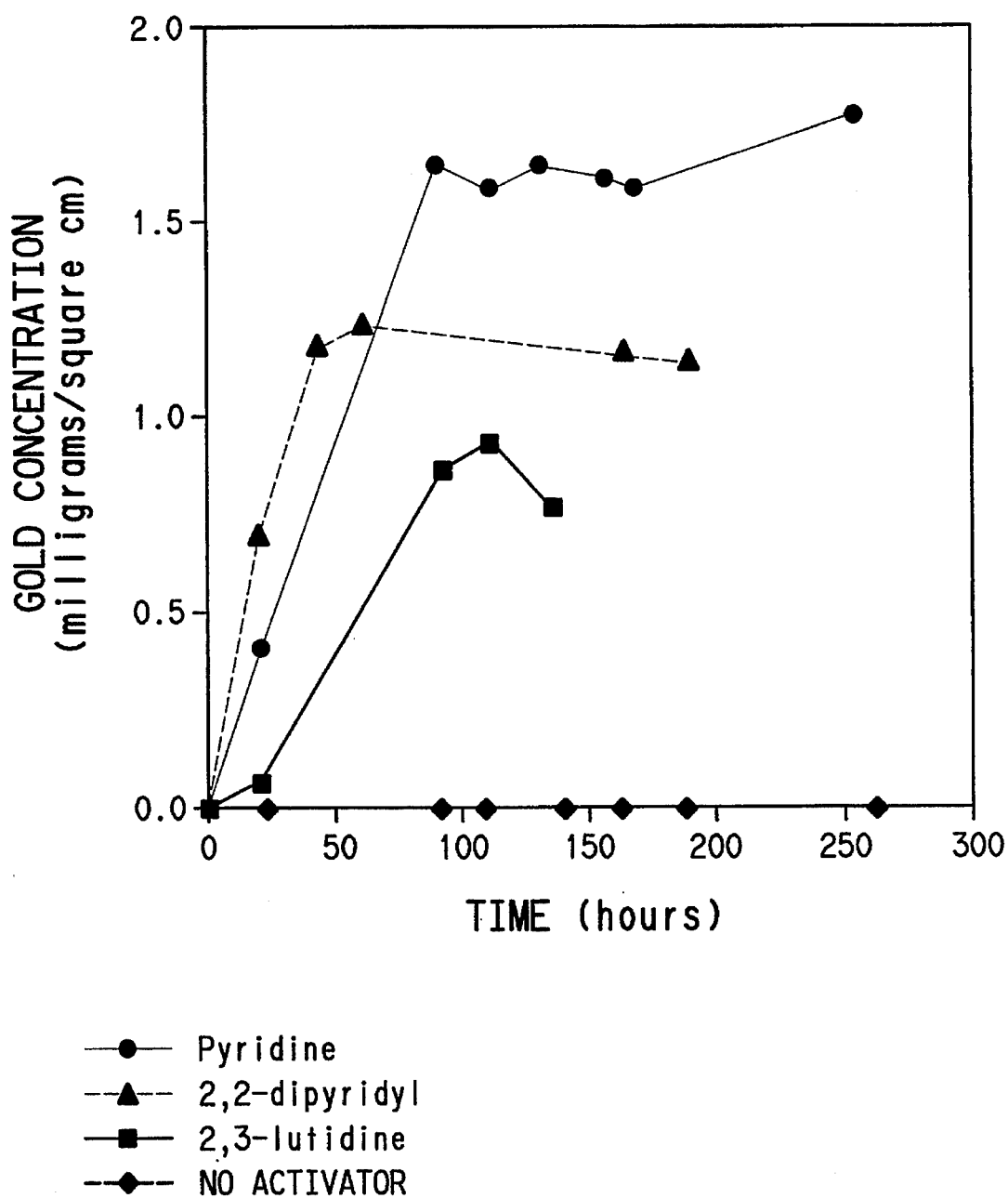
FIG. 1 shows a time course of gold dissolution in sodium chloride-sodium hypochlorite, in the presence and absence of various heterocyclic compounds of the invention.

All of the metal lixiviant systems commonly used in the art today require the addition of a ligand to bind the metal ion and an oxidant to oxidize the metal. With metals such as gold, strong oxidizing agents such as chlorine or bromine are required with many ligands such as chloride and bromide ions. Such lixiviant solutions are highly corrosive and must be handled in expensive equipment that is inert to these materials. Also, such strong oxidizing solutions are often not selective in their oxidizing reactions, leading to unwanted contamination of the desired metal product.

The addition of activator compounds, such as described by Applicants' invention, allows the use of less corrosive solutions to leach metals without significant loss of rate of metal dissolution. Such an activator also allows the use of smaller amounts of reagents to dissolve the metals. Not only will less ligand be needed to dissolve, the metal at acceptable rates, but there will be less reagent to recover and/or destroy at the end of the leaching cycle. In mining applications using sodium cyanide, for example, the use of smaller amounts of cyanide also means the use of smaller amounts of reagents to destroy cyanide at the end of the leaching cycle. In addition, the lower concentrations of cyanide in the tailings pond, pregnant solution pond, and other aqueous solutions, mean a lower environmental risk. Thus, the present invention provides significant benefits, particularly in mining applications.

Applicants' invention is a process for enhancing the dissolution or lixiviation of gold metal by the addition of catalytic amounts of certain heterocyclic aromatic compounds containing nitrogen and/or sulfur in the aromatic ring to the ligand/oxidant lixiviation system.

For purposes of the present disclosure of Applicants' invention, it is intended that the following terms convey the meanings provided below.

The word "lixiviate" means to extract or dissolve out a constituent from a solid mixture. A lixiviant solution or system is one that contains the components necessary to dissolve out the desired constituent. Specifically as used by Applicants to describe the dissolution of gold, the lixiviant system contains both an oxidizing agent which oxidizes gold metal to gold cation, and a ligand to coordinate to the gold cation.

In using the phrase "catalytic amounts" or "catalytic compound" when referring to certain heterocyclic compounds. Applicants intend to convey the traditional meaning of "catalytic", wherein the heterocyclic compounds emerge from the lixiviation process unchanged. Specifically, Webster's Ninth New Collegiate Dictionary defines the term catalysis as "a modification and especially an increase in the rate of a chemical reaction induced by material unchanged chemically at the end of the reaction". A catalyst is usually used in less than a stoichiometric amount.

In using the phrase "lixiviation systems using a ligand and an oxidant", Applicants include cyanide and air or dissolved oxygen; chloride and hypochlorite; bromide and bromine; iodide and iodine; thiocyanate and ferric ions; thiourea and ferric ions; ammonium thiosulfate, copper, ammonia, and air or dissolved oxygen; malononitrile and air or dissolved oxygen; and cyanide, chloride, bromide, iodide, thiocyanate, thiosulfate, malononitrile, and thiourea at a gold electrode in the anodic dissolution of gold.

In describing the "nitrogen and sulfur-containing aromatic heterocyclic compounds" of the invention, Applicants include those compounds wherein at least one nitrogen and/or sulfur heteroatom in the ring is available for coordination to the surface of the solid metal during the dissolution process. Specifically included are aromatic heterocycles containing nitrogen and/or sulfur in the ring, wherein 1) the nitrogen in the ring is not protonated; 2) at least one sulfur or nitrogen in the ring is not substituted; and 3) steric hindrance does not prevent the heteroatom and the aromatic structure containing it from coordinating with the surface of the solid undissolved metal. Steric hindrance could be due, for example, to large substituents on the ring which prevent the approach of either the heteroatom or the heterocyclic ring to the metal surface.

Heterocyclic Compounds of the Invention

The heterocyclic compounds of the invention are effective in a wide variety of lixiviant systems typical for gold-mining operations, most particularly the sodium cyanide-air system, the sodium chloride-hypochlorite system, the sodium bromide-bromine system, the copper-ammonium thiosulfate system, the thiocyanate-ferric ion system, thiourea and ferric ion system, the iodide system and the malononitrile system. However, as described below, not every proposed additive may be equally effective with every lixiviant system because of the possibility of interfering chemical reactions or the properties of each particular lixiviant solutions (pH, solution potential, gold ligand, etc.). Also, Applicants contemplate that the heterocyclic aromatic compounds of this invention will act not only as activators in a variety of lixiviant systems typically used for gold mining operations, but will also be applicable to other operations requiring the dissolution of gold.

The heterocyclic aromatic compounds of this invention have several features in common. All have one or more nitrogen and/or sulfur atoms as part of a heterocyclic aromatic ring, wherein a nitrogen or sulfur heteroatom is available for coordination to the metal surface. The heteroatom must have available a free electron pair for this coordinative bond. The nitrogen-containing compounds must not be sterically hindered, and the pH of the lixiviant solution must be sufficiently alkaline that the nitrogen heteroatoms are not protonated. Examples of suitable nitrogen-bearing heterocyclic aromatic compounds include pyridine, imidazole, N-methylimidazole, 2,2'-dipyridyl, 2,3-, 2,4-, 3,5- and 2,6-lutidine, collidine, pyrazine, substituted triazines, pyrimidines, and fused ring derivatives such as quinoline, isoquinoline, benzimidazole, and substituted benzimidazoles such as 2-aminobenzimidazole. Examples of ineffective or less effective compounds where the nitrogen atom is sterically hindered are 2,6-diphenylpyridine, 2,6-di-t-butylpyridine, and pyridine-N-oxide. Similarly, the coordinating heteroatom must not be protonated; in the case of a nitrogen heterocyclic compound, the pH of the lixiviant system must be greater than the $pK_a$ of the protonated nitrogen atom compound. The sulfur-containing compounds suitable for this invention must also not be sterically hindered. Examples of suitable sulfur-containing compounds are thiophene, 3-thiophenecarboxylic acid, and 3-thiopheneacetonitrile. Ineffective or less effective thiophene derivatives include tetrabromothiophene and 3,6,9,14-tetrathiabicyclo[9.2.1]tetradeca-11,13-diene. Inactivity of compounds does not necessarily imply a lack of binding to the metal surface.

By heterocyclic aromatic compounds Applicants refer to the traditional definition of "aromatic" as commonly used in the art of organic chemistry (J. March, Advanced Organic Chemistry, 4th Ed. Wiley & Sons, 1992). Included are organic ring compounds containing at least one heteroatom (or atom other than carbon) in which the ring is a closed or cyclic, fully conjugated system with 4n+2 (n=0,1,2,3 . . .) π-electrons in the conjugated system. For example pyridine, a six membered ring with a nitrogen atom, is such a heterocyclic aromatic compound, with nitrogen and each carbon in the ring donating one electron to the π-system for a total of six π-electrons. Thiophene, a five membered ring with a sulfur atom, is also aromatic, with the sulfur donating two electrons and each carbon donating one electron for a total of 6 π-electrons. Aromatic character also implies other important features of the molecules useful in this invention. The rings described above have flat or planar structure with the heterocyclic atom as part of the planar molecular framework. However, there is no requirement that the entire molecule of the active compound be planar. Substituents can dramatically affect activity of heterocyclic compounds by the changes in the aromaticity of the ring. Both 2-hydroxypyridine and 4-hydroxypyridine are ineffective compounds in catalysis of cyanidation of gold, whereas 3-hydroxypyridine is an effective catalyst. This inactivity results from the fact that the 2- and 4-hydroxy derivatives exist as keto tautomers, thus diminishing the aromatic character and protonating the pyridine nitrogen. This tautomer is not important for 3-hydroxypyridine, which remains fully aromatic with an unprotonated nitrogen atom. Similar examples are possible with other nitrogen-containing aromatic ring systems.

A wide variety of substituents on the aromatic heterocyclic rings can be tolerated or even increase the activity of the parent heterocyclic aromatic compounds. The parent compounds include, for example, pyridine, pyrazine, pyrimidine, imidazole, oxazole, pyrazole, thiazole, thiadiazole, thiatriazole, thiazine, thiophene, and triazole, as well as fused ring derivatives such as quinoline, isoquinoline, benzimidazole, benzothiophene. Substituents include alkyl groups (such as methyl, ethyl, propyl, and butyl), alkoxy groups (such as methoxy and ethoxy), aryl groups (such as phenyl and tolyl groups), heterocyclic aromatic groups (such as pyridyl, pyrazolyl, imidazoyl, and thiophenyl), amino and substituted amino groups (such as in 4-dimethylaminopyridine) carboxy, acetyl, and halide (fluoride, chloride, bromide, iodide). Combination of substituents are also effective; for example, amino and hydroxyl substituents on an alkyl chain as a pyridine substituent (such as 2-(2-hydroxyethyl)pyridine) yield active compounds. Nitrogen heterocyclic aromatic compounds with substituents that increase the $pK_a$ of the nitrogen atom in the ring are more effective activators, provided the lixiviant system operates in the appropriate pH range.

Compounds can be screened electrochemically for activator activity. Cyclic voltammograms are employed, comparing the solutions of the ligand of interest with and without the activator candidate. In this technique, the voltage between two electrodes (a working electrode of gold and a counter electrode, such as of platinum) is varied while the current flow between the electrodes is measured. When an oxidation or reduction reaction takes place at an electrode at a particular voltage, a current flows between the electrodes. Dissolution of the gold electrode is shown by a rise in the current flow at a particular voltage. This current flow is referred to as an oxidation wave or as an anodic peak; the potential at which this occurs is the oxidation potential. Without an activator, or with an ineffective compound, an oxidation wave is observed only at an oxidation potential dependent upon the ligand in solution. In the presence of an activator, an additional wave is observed in a passive region of the voltammogram for the unactivated case; this new wave is cathodically shifted (at a lower potential) from the peak in the unactivated case.

For example, in a chloride solution, the process producing the anodic peak is:

This process corresponds to the anodic dissolution of gold. In the presence of even low concentrations of activator compounds, an additional peak cathodic to the first peak is observed, but the same gold product is obtained. That is, the activator compound has activated the gold electrode for dissolution.

Importantly, this new oxidation wave results from the combination of the ligand (such as chloride ion) with the activator (such as pyridine) in a synergistic fashion, which actually shifts the gold oxidation wave to a lower potential. Similar effects on gold oxidation potentials may be seen with different combinations of activator (such as pyridine, imidazole, N-methylimidazole, or 3-thiophenecarboxylic acid) and ligand (such as chloride, bromide, iodide, thiocyanate, malononitrile or cyanide). In some cases, such as with thiosulfate as ligand, a new peak is not observed; rather the current due to gold oxidation increases dramatically on addition of low concentrations of an activator such as pyridine. The increased current flow indicates increased anodic dissolution of gold in the thiosulfate solution.

This new or enhanced peak is not observed in solutions of the activator with an anion that does not coordinate to gold (such as perchlorate or nitrate); thus the new peak does not result from the interaction of the activator with the gold surface alone.

Cyclic voltammograms of a gold electrode in solutions of the activator by itself are very different. In fact, with most of the nitrogen heterocyclic compounds by themselves, under non-acidic conditions, there is no evidence for the dissolving of the gold electrode.

The prior art gives no evidence of this ability for these activators to shift the oxidation wave to a lower-potential. In fact, when pyridine is used in solutions containing anions such as perchlorate, which does not form a stable gold complex, the pyridine was found to increase the oxidation wave potential and hence protect the gold surface from anodic reactions. (P. Zelenay, L. M. Rice-Jackson, and A. Wieckowski, *Langmuir*, 6, 974–979 (1990)).

While not exhaustive of the possible nitrogen and sulfur aromatic heterocycles suitable for the present invention, the following list provides specifically preferred compounds:

| | |
|---|---|
| 2-(aminomethyl)pyridine | 2-propylpyridine, |
| 2-aminopyridine | 2,2'-pyridil |
| 3-aminopyridine | pyridine |
| 4-aminopyridine | 3-aminopyrazole |
| 2,2'-dipyridyl | 3,5-dimethylpyrazole |
| 4,4'-dipyridyl | 4-methylpyrazole |
| 2,2'-dipyridylamine | 3-methylpyrazole |
| di-2-pyridyl ketone | 1-phenylpyrazole |
| 4-t-butylpyridine | pyrazole |
| 2-chloropyridine | 1-(3-aminopropyl)imidazole |
| 2,4,6-collidine | 2,2'-bis(4,5-dimethyl- |
| 4-dimethylaminopyridine | imidazole) |
| 2-ethylpyridine | 4,5-dicyanoimidazole |
| 2-fluoropyridine | 1,2-dimethylimidazole |
| 2-(2-hydroxyethyl)pyridine | 2-ethylimidazole |
| 3-hydroxypyridine | histamine |
| 2,3-lutidine | histidine ethyl ester |
| 2,4-lutidine | imidazole |
| 2,6-lutidine | N-methylimidazole |
| 3,5-lutidine | 2-methylimidazole |
| 2-methoxypyridine | 4-methylimidazole |
| nicotinamide | N-phenylimidazole |
| nicotinic acid | 2-acetylthiophene |
| 2-phenylpyridine | 3-bromothiophene |
| 3-phenylpyridine | 2,5-dimethylthiophene |
| 4-phenylpyridine | 2-methylthiophene |
| 2-picoline | 3-methylthiophene |
| 3-picoline | thiophene |
| 4-picoline | 3-thiopheneacetic acid |
| 2-thiophenecarboxylic acid | quinoline |
| 3-thiophenecarboxylic acid | 2-aminobenzimidazole |
| 2-thiophenemethanol | 2-aminoimidazole |
| 2-aminothiazole | aminopyrazine |
| 3-amino-5,6-dimethyl- | 2-aminopyrimidine |
| 1,2,4-triazine | 2-amino-4,6-dimethyl- |
| 2-amino-1,3,4-thiadiazole | pyrimidine |
| 2,4,5-trimethyloxazole | 2,6-diaminopyridine |
| trimethylpyrazine | L-histidine |
| benzimidazole | DL-histidine |
| benzothiazole | pyrazine |
| benzotriazole | tetramethylpyrazine |
| isoquinoline | trimethylpyrazine |

-continued

| |
|---|
| 1,10-phenanthroline |

The Ligand/Oxidant Systems of the Invention

The lixiviate systems of the invention are those generally known in this art to be effective in dissolving gold using a ligand/oxidant system, and particularly included are: cyanide ion and air or dissolved oxygen; chloride ion with sodium hypochlorite (a stabilizer such as sulfamic acid may be used); bromide ion with bromine, in the presence of a stabilizer such as sulfamic acid; iodide and iodine; thiocyanate and ferric ions; thiourea and ferric ion; thiosulfate anion with copper ion as a catalyst in the presence of ammonia and air or dissolved oxygen; malononitrile and air or dissolved .oxygen; and cyanide, chloride, bromide, iodide, thiocyanate, thiosulfate, malononitrile, or thiourea and a gold electrode at a potential appropriate for each of these ions. Each of the activators listed above may not be appropriate for all of the lixiviant solutions, owing to side reactions, pH, or poor binding to the gold surface under the reaction conditions with the, particular system. The choice of ligand concentration, oxidant concentration, activator concentration, and pH depend on the system to be extracted. Appropriate lixiviant-activator combinations can be screened electrochemically, as described further herein.

Cyanide with air or dissolved oxygen is the lixiviant system of choice for most applications to recover gold (such as gold mining and gold recovery in the plating industry). E. B. Saubestre in "Modern Electroplating", F. A. Lowenheim, Ed., John Wiley and Sons, Inc., New York, 1953, pages 748–770. Such systems are usually run at basic pHs, owing to the generation of HCN as the pH is lowered below 10 ($pK_a$ of HCN, 9.1). The choice of concentrations of cyanide and activator depends on the particular application. In the measurement of gold dissolution rates with air and with gold powder, foils, rods, or disks, low cyanide concentrations (2–10 mM cyanide) give the best results. However, the electrochemical studies demonstrate that activation of gold dissolution can be observed over a wide range of cyanide concentration. In mining applications, the choice of cyanide concentration depends on many factors. Low concentration of activators (1–10 ppm) with typical cyanide concentrations are preferred. The basic pHs typical of cyanidation reactions are appropriate for activators. In some cases, cyanidations are run at lower pH (<9). The activator must be chosen under these conditions so that the heteroatom in the heterocyclic aromatic ring is not protonated. A wide range of activators are suitable with cyanide systems. The preferred compounds are imidazole, N-methylimidazole, 1,2-dimethylimidazole, pyridine, α-, β-, γ-picoline, 2-, 3-, 4-aminopyridine, 4-dimethylaminopyridine, thiophene, 3-thiophenecarboxylic acid, 3-thiopheneacetic acid, pyrazine, 2,4,6-trimethyltriazine, thiazole, L-histidine, 2-aminopyrimidine, nicotinamide, 2-amino-4,6-dimethylpyrimidine. The most preferred are imidazole, N-methylimidazole, L-histidine and 2-aminopyrimidine.

The chloride-hypochlorite system can be used as an alternative to cyanide. See, for example, J. B. Hiskey and V. P. Atluri, *Mineral Processing and Extractive Metallurgy Review*, 4, 95–134 (1988), and U.S. Pat. No. 5,169,503, which are incorporated herein by reference. This system is typically run at greater than 3% NaCl and a pH of 5–8. The use of activators allows this system to be run under less corrosive conditions with less chloride. The preferred chloride lixiviant system with activators consists of 2–5% NaCl (or other chloride source) with 0.1% sodium hypochlorite at a pH of 8–8.5. In both cases, a stabilizer for hypochlorite is desirable. Stabilizers are compounds in which the chlorine is still active but in a more stable form. The stabilizer must be chosen such that it does not interfere with the gold dissolution reaction. Sulfamic acid is suitable for use with the sodium chloride-sodium hypochlorite lixiviant-solution. In this case, sulfamic acid reacts with the hypochlorite anion to generate N-chlorosulfamic acids in which the chlorine is still active. See, for example, "Kirk-Othmer Encyclopedia of Chemical Technology", Vol. 21 John Wiley and Sons, New York, 1983, pages 949–956. The activator must be chosen such that the heteroatom of the heterocyclic aromatic compound is available for coordination to the gold surface and there is no reaction with the other constituents of the lixiviant solution. The preferred activators are pyridine, α-, β-, γ-picoline, di-2-pyridyl ketone, 2,2'-dipyridyl, 3,5-lutidine, 2,6-lutidine, 2,3-lutidine, and N-methylimidazole.

The bromide-bromine system can be used as an alternative to cyanide. See, for example, J. B. Hiskey and V. P. Atluri, *Mineral Processing and Extractive Metallurgy Review*, 4, 95–134 (1988); J. Marsden and I House, "The Chemistry of Gold Extraction", Ellis Horwood, New York, 1992, pages 304–305; and A. Dadgar, *Journal of the Minerals, Metals, and Materials Society*, 41, 37–41 (1989), which are incorporated herein by reference. The considerations for choice of activator are the same as those for the chloride-hypochlorite system. The preferred bromide system with activators consists of 1% NaBr (or other bromide source) with 0.3% bromine in the presence of sulfamic acid at pH 9.0. The preferred activator's are pyridine, (α-, β-, γ-picoline, di-2-pyridyl ketone, 2,2'-dipyridyl, 3,5-lutidine, 2,6-lutidine, 2,3-lutidine, and N-methylimidazole.

The thiosulfate-copper-ammonia-air or dissolved oxygen system can be used as an alternative to cyanide. See, for example, J. B. Hiskey and V. P. Atluri, *Mineral Processing and Extractive Metallurgy Review*, 4, 95–134 (1988); J. Marsden and I. House, "The Chemistry of Gold Extraction", Ellis Horwood, New York, 1992, pages 303–304; C. Changlin, H. Jiexue, and G. Qian, "Leaching Gold by Low Concentration Thiosulfate Solution", Randol Gold Forum, Vancouver '92, March 25–27, 1992, pages 293–298; J. Tao, C. Jin, and X. Shi in "Hydrometallurgy", J. B. Hiskey and G. W. Warren, Eds., Society for Mining, Metallurgy and Exploration, Inc., Littleton, Colo. 1993, pages 119–126; and M. J. Nicol, C. A. Fleming, and R. L. Paul, in "The Extractive Metallurgy of Gold in South Africa", Volume 2, G. G. Stanley, Ed., South African Institute of Mining and Metallurgy, Johannesburg, 1987, pages 831–905 which are incorporated herein by reference. A range of reagent concentrations can be used in thiosulfate systems: thiosulfate ion, 0.1–0.25M; copper(II) ion, 0.01–0.15M; ammonium ion (as thiosulfate, hydroxide and sulfate salts), 0.5–4.8M. The preferred conditions are 0.1M sodium thiosulfate, 0.01.M copper sulfate, and 0.5M ammonium hydroxide. The preferred activators are pyridine, α-, β-, γ-picoline, di-2-pyridyl ketone, 2,2'-dipyridyl, 3,5-lutidine, 2,6-lutidine, 2,3-lutidine, imidazole, N-methylimidazole, thiophene, 3-thiophenecarboxylic acid, 3-thiopheneacetic acid, pyrazine, 2,4,6-trimethyltriazine, and thiazole.

Other gold lixiviants can be handled in an analogous fashion, that is, addition of an appropriate activator to the usual conditions used for that lixiviant system. Iodide-iodine system has been used as a gold lixiviant. A wide range of concentrations over a wide range of pH are useable. However, 0.03M sodium iodide in the presence of 0.005M iodine at pH 5 yields an acceptable rate of gold dissolution. (P. H. Qi and J. B. Hiskey, *Hydrometallurgy*, 27, 47–66 (1991) and F. W. DeVries and J. B. Hiskey, "Environmental Impact of Lixiviants: An Overview that Includes Noncyanide Chemistry", Randol Gold Forum, Vancouver '92, March 25–27, 1992, pages 89–92). The pseudohalide thiocyanate has also been used as a gold lixiviant. (J. Marsden and I. House, "The Chemistry of Gold Extraction", Ellis Horwood, New York, 1992, pages 303–304; and O. Barbosa F and A. J. Monhemius in "Precious Metals '89", M. C. Jha and S. D. Hill, Eds., The Minerals, Metals, and Materials Society, pages 307–339 (1988)). Reactions with this ligand typically contain 10–15 g/L sodium thiocyanate and 1–10 g/L ferric ion as oxidant in the pH range of 2–3. Malononitrile is another pseudohalide that is used as a gold lixiviant in the presence of air or oxygen (H. J. Heinen, J. A. Eisele, and B. J. Scheiner, "Malononitrile Extraction of Gold From Ores", *Bureau of Mines Report of Investigation* 7464, 1970 and K. R. Sandgren and J. E. Murphy in "Hydrometallurgy", J. B. Hiskey and G. W. Warren, Eds., Society for Mining, Metallurgy and Exploration, Inc., Littleton, Colo., 1993, pages 301–310). Reactions with this ligand typically employ 0.01–1.0% malononitrile over a wide pH range (7.5–12). Thiourea is another compound that is used as a gold lixiviant, with ferric ion or hydrogen peroxide as oxidizing agents (J Marsden and I . House, "The Chemistry of Gold Extraction", Ellis Horwood, New York, 1992, pages 299–302;M. J. Nicol, C. A. Fleming, and R. L. Paul, in "The Extraction Metallurgy of Gold in South Africa", Volume 2, G. G. Stanley, Ed., South African Institute of Mining and Metallurgy, Johannesburg, 1987, pages 845–846; and J. B. Hiskey and V. P. Atluri, *Mineral Processing and Extractive Metallurgy Review*, 4, 95–134 (1988). Reactions with this ligand typically utilize thiourea (1–5 g/L) and ferric ion (0.5–5 g/L) at pH 1–3.

The aromatic heterocyclic compounds of the invention, and the reagents used in the ligand/oxidant lixiviation systems described, are well known in this art and readily available commercially. The invention is illustrated by the following non-limiting Examples.

EXAMPLE 1

Activation of Gold Dissolution in Sodium Chloride-Hypochlorite Solution at pH 8.5

In this example, the addition of activator compounds allows the use of sodium hypochlorite as an oxidant under conditions that would otherwise dissolve little or no gold. These reactions were performed in a buffered solution at pH 8.5 prepared in the following manner. Sodium borate (0.955 g) and sulfamic acid (0.05 g) were mixed with approximately 40 mL of HPLC grade water (high performance liquid chromatography grade). The mixture was stirred until all the solids were dissolved. Sodium chloride (1.25 g) was added. The solution pH was adjusted to 8.5 with 1N HCl. Standardized sodium hypochlorite was added to yield a 0.1% by weight solution, and the pH again adjusted to 8.5. The solution was then transferred to a 50 mL volumetric flask. The activator was then added to the solution. The solution was diluted to volume with HPLC grade water. A 2 mL aliquot sample was withdrawn for analysis at time zero. The remainder of the solution was added to a jar with a premeasured piece of gold foil (1 cm×5 cm×0.1 mm), and aliquot samples withdrawn periodically for analysis of the gold content.

The samples were then analyzed by converting the dissolved gold complex to $[AuBr_4]^-$, extracting the bromide complex into chloroform with trioctylphosphine oxide, and measuring the absorbance of this solution to determine gold concentration (F. E. Beamish and J. C. van Loon, "Recent Advances in the Analytical Chemistry of the Noble Metals", Pergamon Press New York, 1972, pages 322–323 and W. N. Holbrook and E. Rein, *Analytical Chemistry*, 36, 2451–2453 (1964)). The rates of gold dissolution were calculated by plotting dissolved gold (micrograms of gold per sq. cm. of foil) versus the time in hours. The number of hours used was recorded at the point where the gold concentration reached a maximum. Table 1 below lists the activator used and the results:

TABLE 1

| | Gold Dissolution Reactions at pH 8.5 with 2.5% Sodium Chloride | | |
|---|---|---|---|
| Compound | Weight or Volume Added | Rate (microgm/sq. cm/hr) | Reaction Time (hours) |
| None | | 0.0 | 263.5 |
| pyridine | 50 μL | 1.5 | 252.5 |
| 2,3-lutidine | 25 μL | 8.1 | 137 |
| 2,2'-dipyridyl | 0.025 g | 17.9 | 252.5 |

At this high pH, the sodium hypochlorite by itself is shown to be too weak an oxidizing agent to effect any measurable dissolution of gold. However, with an activator present, this weak oxidizing agent becomes very effective.

In FIG. 1, typical measurements of dissolved gold concentration versus time for several reactions are shown graphically.

EXAMPLE 2

Activation of Gold Dissolution in Sodium Bromide-Bromine Solution using Pyridine In this example, the activator catalyzes the dissolution of gold in a solution that contains sodium bromide and an oxidizing agent prepared by the addition of bromine to a basic solution; this procedure generates hypobromite (R. C. Troy and D. W. Margerum, *Inorganic Chemistry*, 30, 3538–3543 (1991)). Sodium bromide (1.00 g), sodium borate (1.910 g), and sulfamic acid (0.10 g) were mixed with 90 mL of HPLC grade water. The pH was adjusted to 9.0 (with NaOH). The beaker was then chilled in ice for 0.25hours. Then 100 microliters of bromine was added. The mixture was stirred at ice temperature for 0.5 hours and then warmed to room temperature. The solution pH was adjusted to 9.0 (with NaOH), transferred to a 100 mL volumetric flask, and diluted to volume. The solution was then split into two parts: 50 mL was stirred with a sample of gold foil of the size in Example 1, and the other 50 mL was mixed with 100 microliters of pyridine and stirred with a duplicate sample of gold foil.

Figure 2:
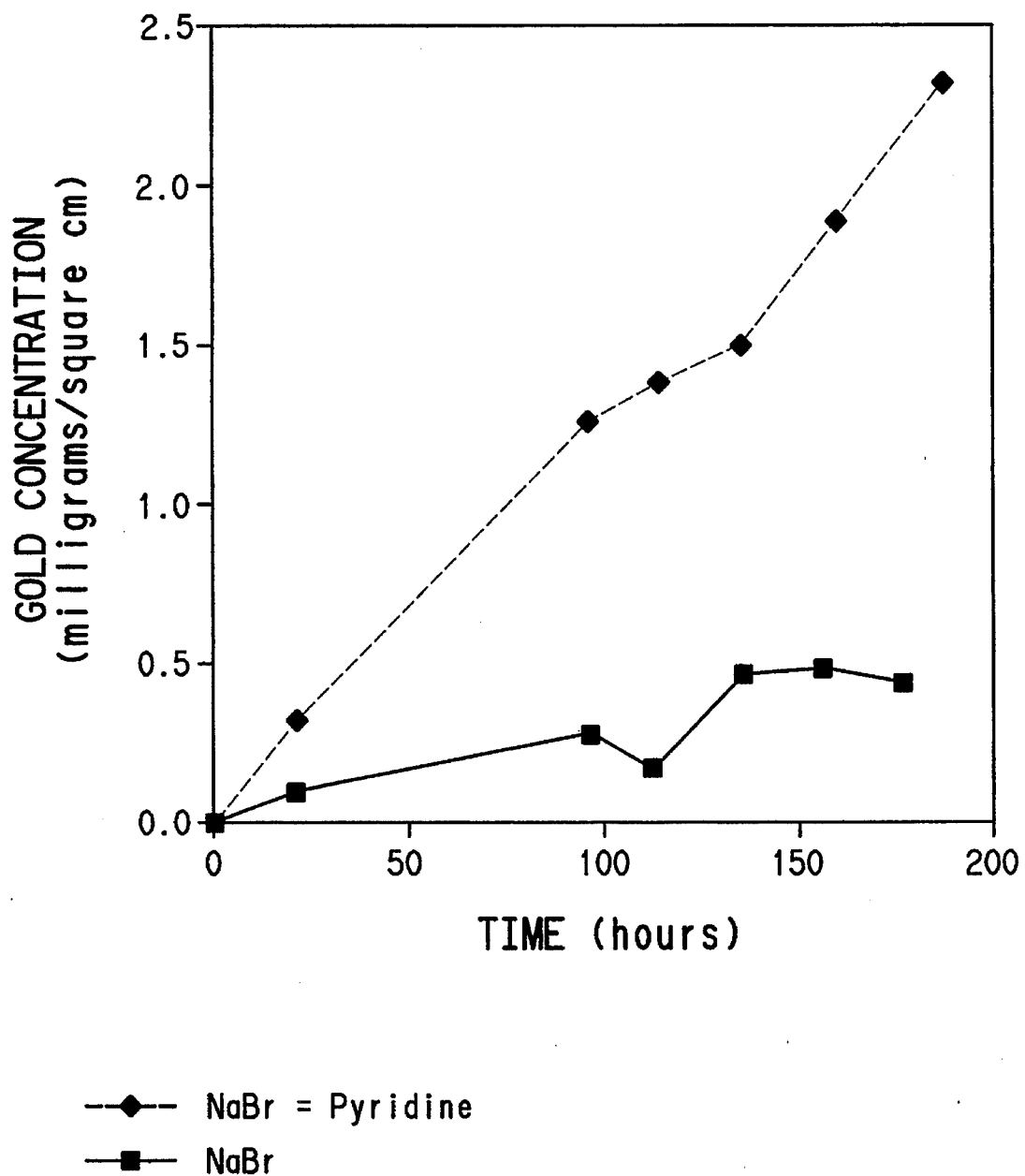
FIG. 2 shows a time course of gold dissolution in sodium bromide-sodium hypobromite, in the presence and absence of pyridine.

Aliquot samples were then withdrawn at intervals and analyzed as in Example 1. Results are shown graphically in FIG. 2. The sample with pyridine clearly shows a much faster rate of gold dissolution than the sample without pyridine.

EXAMPLE 3

Activation of Gold Dissolution in Sodium Cyanide Solution using a Nitrogen Heterocycle In this example, the addition of an activator allows increased rates of gold dissolution in a sodium cyanide-air system. The reactions were carried out in NaCN solutions at pH 10.5 prepared in the following manner. NaCN (0.033 g) was added to 100 mL water and 10.0 mL of 0.10 molar potassium phosphate buffer at pH 11. The final solution pH was adjusted to 10.5 by addition of $K_2HPO_4$. The concentration of cyanide was determined to be 5.98 millimolar (mM) by titration with silver nitrate. A gold sample (surface area of 0.495 sq.cm.) was prepared by vacuum deposition of a 2000 angstrom layer of gold onto a plastic backing. The sodium cyanide solution (2.50 mL) was added to a gold sample and a UV blank was run of this solution to zero the instrument against the starting solution. The solution was stirred at 25° C. and the absorbance (at 240 nm) due to the $[Au(CN)_2]^-$ formed was measured every 5 seconds for 200 seconds. The zero order rate constant was obtained by fitting a best straight line through the data points. After 200 seconds, 20 microliters of a 0.013 molar solution of N-methylimidazole previously prepared by the addition of 0.107 g of N-methylimidazole to 110 mL of water was added. The formation of $[Au(CN)_2]^-$ was then followed for another 400 seconds and the zero order rate constant determined as before. The relative rate of gold dissolution in the presence of the activator was obtained by dividing the zero order rate constant with the activator by that without activator. Results, including a repeat trial, are tabulated in Table 2.

TABLE 2

| Gold Dissolution Reactions at pH 10.5 with 5.98 millimolar (mM) NaCN | | |
|---|---|---|
| N-Methylimidazole Concentration (mM) | Rate (M/sec) × $10^{-8}$ | Relative Rate (ratio to base rate) |
| 0.00 | 9.56 | 1.00 |
| 0.10 | 22.2 | 2.32 |
| 0.21 | 25.2 | 2.66 |
| Repeat | | |
| 0.00 | 9.79 | 1.00 |
| 0.15 | 19.9 | 2.03 |
| 0.31 | 28.2 | 2.88 |

EXAMPLE 4

Activation of Gold Dissolution in Sodium Cyanide Solution using a Sulfur Heterocycle In this example, the addition of an activator allows increased rates of gold dissolution in a cyanide solution. The reactions were carried out in buffered NaCN solutions at pH 10.5 prepared in the following manner. NaCN (0.027 g) was added to 100.0 mL $H_2O$ and 10.0 mL of 0.10M phosphate buffer at pH 11. The final solution pH was adjusted to 10.5 by addition of $K_2HPO_4$. The concentration of cyanide was determined to be 4.74 mM by titration with $AgNO_3$. A gold sample (surface area of 0.495 sq. cm.) was prepared as in Example 3. The sodium cyanide solution (2.00 mL) was added to the gold sample and a UV blank was run on this solution. The solution was stirred and maintained at 25° C. throughout the dissolution reaction. Absorbance at 240 nm due to the $[AuCN_2]^-$ formed during the reaction was measured every 5 seconds for 100 seconds and the zero order rate constant was obtained by fitting a best straight line through the data points. A 9.67 mM solution of 3-thiophenecarboxylic acid was prepared by adding 0.031 grams to 25 mL of a solution of 60 parts by volume of water and 40 parts of methanol. Then 64 microliters of this solution was added to the gold sample in buffered cyanide solution as described above, the formation of $[Au(CN)_2]^-$ was followed for another 100 seconds, and the zero order rate determined as before. The relative rate of gold dissolution in the presence of the activator was obtained by dividing the zero order rate constant with the activator by that without the activator. Results, including a repeat trial, are shown in Table 3.

TABLE 3

Gold Dissolution Reactions at pH 10.5 with 5.98 mM Sodium Cyanide

| 3-Thiophenecarboxylic Acid Concentration (mM) | Rate (M/sec) × $10^{-8}$ | Relative Rate (ratio to base rate) |
| --- | --- | --- |
| 0.00 | 5.91 | 1.00 |
| 0.20 | 12.7 | 2.10 |
| Repeat | | |
| 0.00 | 5.34 | 1.00 |
| 0.30 | 18.3 | 3.43 |

EXAMPLE 5

Activation of Gold Dissolution in Sodium Thiosulfate Solution using Pyridine

Figure 3:
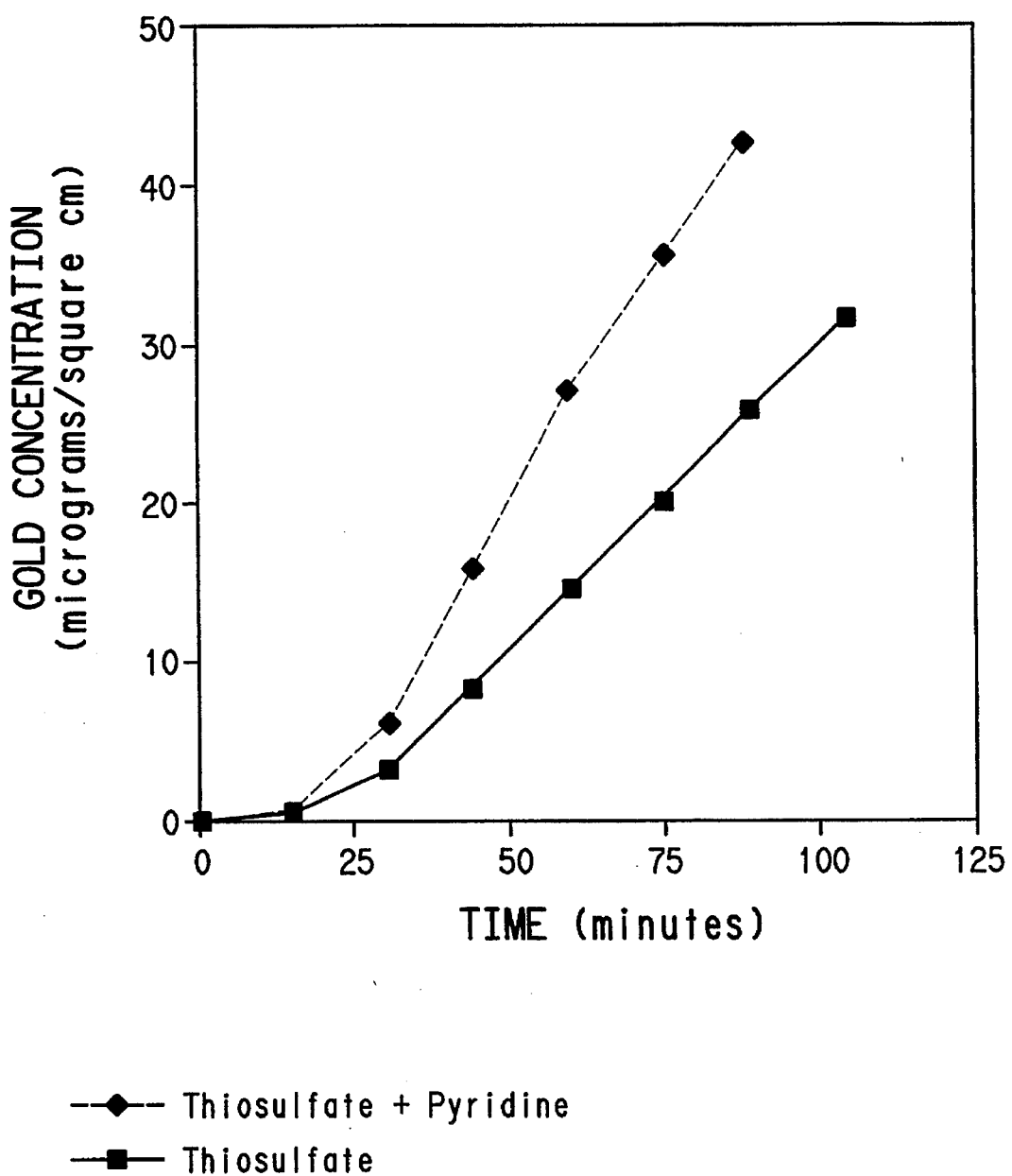
FIG. 3 shows dissolution of gold in ammoniacal copper-thiosulfate-air, in the presence and absence of pyridine.

In this example, the addition of an activator catalyzes the dissolution of gold foil in basic thiosulfate solution with cupric ion added as oxidation catalyst. The thiosulfate solution was prepared by dissolving sodium thiosulfate (1.242 g of $Na_2S_2O_3 \cdot 5H_2O$) and copper sulfate (0.079 g) in approximately 40 mL of HPLC grade water. Ammonium hydroxide (5 mL of concentrated $NH_4OH$) was then added. The solution was diluted to volume in a 50 mL volumetric flask to yield a solution of 0.1M sodium thiosulfate, 0.01M copper sulfate, and 0.5M ammonium hydroxide. A zero time point gold concentration was determined by withdrawal of 0.5 mL of solution, addition to 1.0 mL aqua regia in a 10 mL volumetric flask, and dilution to volume. Gold concentration was determined by graphite furnace atomic absorption spectroscopy. The remaining solution was transferred to a screw-type jar. A piece of gold foil (1 cm×5 cm×0.1 mm) was added. The jar was capped. Aliquots (0.5 mL) were withdrawn every 15 minutes for gold analysis as described above. FIG. 3 shows gold concentrations in this study. The above procedure was then repeated with a pyridine activator. After transfer of the ammoniacal copper-thiosulfate solution to the jar, 1 microliter of pyridine was added, followed by the gold foil. Gold analyses were carried out as described above. Comparison of the two time courses in FIG. 3 shows that the sample with pyridine gives a much faster rate of gold dissolution than the sample without the activator.

EXAMPLE 6

Figure 4:
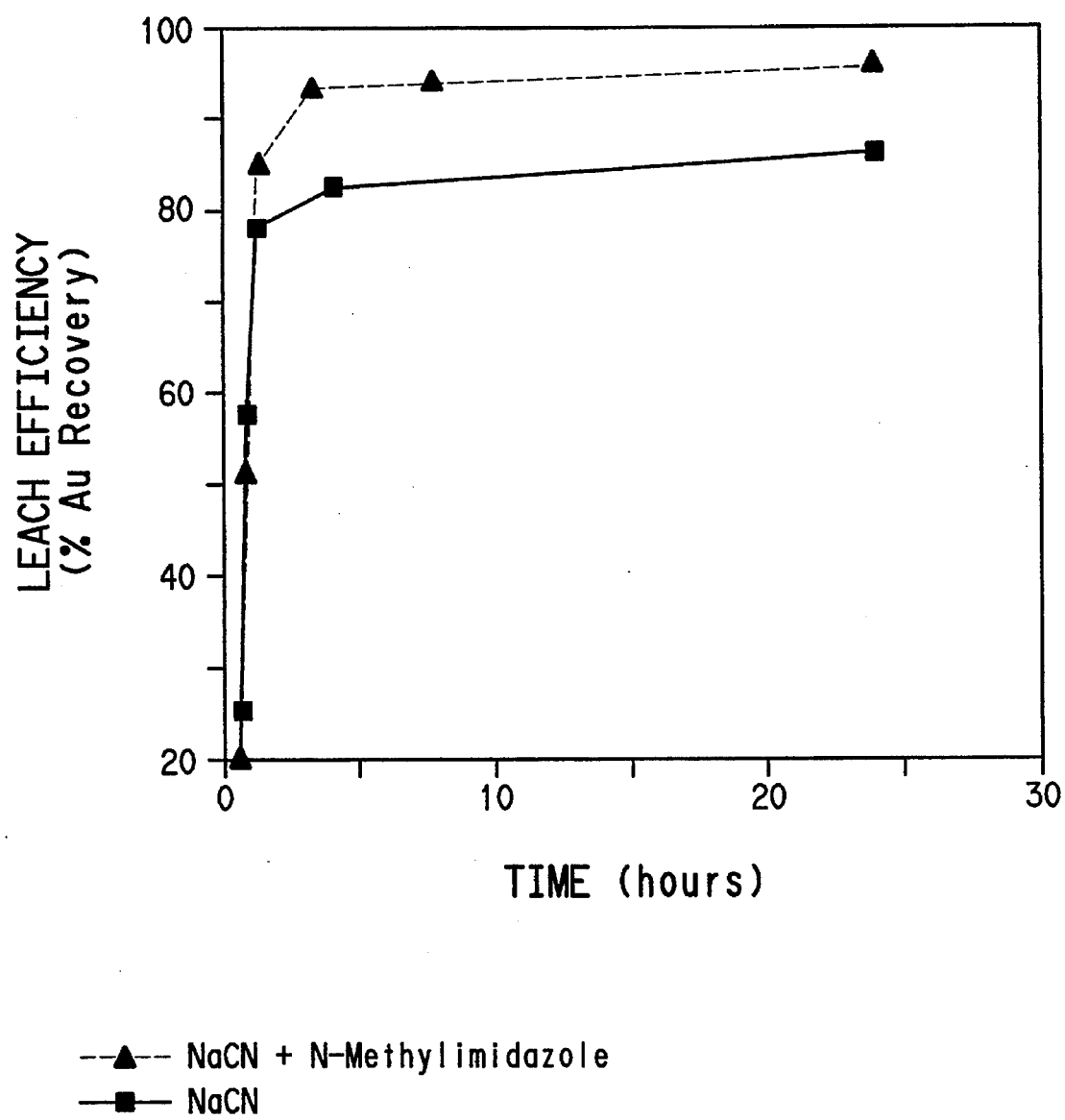
FIG. 4 shows leach efficiency from gold ore with sodium cyanide-air solution, in the presence and absence of 5 ppm N-methylimidazole.

Activation of Gold Dissolution in Oxidized Gold Ore Using Sodium Cyanide Solution with Nitrogen Heterocycle This example was carried out with a gold ore which had been crushed and milled until 80% would pass through a 200 mesh screen. The ore was slurried with water to 40–50% solids density. The solution pH was adjusted to 10.5 with lime. Sodium cyanide was then added to yield a final solution of 0.4 g NaCN/liter. Gold concentrations were determined by atomic absorption spectroscopy. FIG. 4 shows the time courses for agitated leach solutions with this ore in the solution described above and the solution described above with 5 mg/liter of N-methylimidazole added. The figure shows that the N-methylimidazole catalyzes the dissolution of gold in cyanide solutions. The catalyzed reaction reaches the maximum gold leach efficiency much more quickly than the uncatalyzed reaction.

EXAMPLE 7

Effect of Nitrogen Heterocycle Activators on Gold Electrodes with a Variety of Ligands In this example, the effects of the activators pyridine and N-methylimidazole on the cyclic voltammogram of a gold electrode in a ligand solution are demonstrated. All potentials are relative to a silver-silver chloride reference electrode. The ligands are chloride, bromide, iodide, thiocyanate, thiosulfate, and malononitrile. Gold electrodes for each ligand solution were prepared by electroplating a gold layer on a glassy carbon electrode from a gold chloride solution in HPLC grade water, first oxidizing the electrode at +1.00 volts until a current of 0.01 milliamperes or less was obtained, and then plating the gold from an unstirred solution of $[AuCl_4]^-$ under a nitrogen atmosphere at 0.00 volts, for 5 to 10 minutes. The voltammogram conditions (ligand concentrations and pH) are shown in Table 4 below. Unless otherwise noted, the supporting electrolyte in all cases was 0.05M KF. The cyclic voltammogram was first recorded for each ligand in an activator-free solution. The activator was then added to attain the desired concentration and the cyclic voltammogram was then recorded over the same range of potentials.

Two responses were observed, each consistent with activation of the gold dissolution reaction. With the halides and pseudohalides (chloride, bromide, iodide, thiocyanate, malononitrile, and cyanide), a new oxidation wave (anodic peak) appears at a lower potential. In some cases, such as thiocyanate, the new wave overlaps with that from the ligand solution alone.

With thiosulfate anion, a new wave was not observed; rather, a dramatic increase in the current at the Au(O)/Au(I) oxidation potential was observed when the activator (pyridine) was added to the electrolyte solution. This example demonstrated unambiguously that pyridine catalyzed the dissolution of gold in a thiosulfate solution.

TABLE 4

Anodic Peak ($E_a$, V) Potential for Gold Electrodes in Various Ligand Solutions

| Ligand | Activator (concentration, mM) | Anodic Peak Postion (V) | Notes |
| --- | --- | --- | --- |
| chloride | none | 1.19 | 1 |
| chloride | pyridine (5 mM) | 0.93, 1.23 | 1 |
| bromide | none | 1.02 | 2 |
| bromide | pyridine (12 mM) | 0.77, 1.06 | 2 |
| iodide | none | 0.53 | 3 |
| iodide | N-methylimidazole | 0.47, 0.69 | 3 |
| thiocyanate | none | 0.88 | 4 |
| thiocyanate | N-methylimidazole | 0.81 | 4 |
| malononitrile | none | 0.46 | 5 |
| malononitrile | N-methylimidazole | 0.10 | 5 |
| thiosulfate | none | 0.53 | 6 |
| thiosulfate | pyridine | 0.56 | 6,7 |

Notes:
1. The chloride concentration was 10 millimolar (mM), pH was 8.5.
2. The bromide concentration was 10 mM, pH was 8.5.
3. The iodide concentration was 6 mM, pH was 8.5.
4. The thiocyanate concentration was 10 mM, pH was 8.6.
5. Malononitrile concentration was 30 mM, pH was 10.5.
6. Thiosulfate concentration was 24 mM, pH was 8.5.

TABLE 4-continued

Anodic Peak ($E_a$, V) Potential for
Gold Electrodes in Various Ligand Solutions

| Ligand | Activator (concentration, mM) | Anodic Peak Postion (V) | Notes |
|---|---|---|---|

7. The current increased significantly on addition of the activator: from 0.057 milliamperes in the solution without pyridine to 0.132 milliamperes in the solution with pyridine.

In summary, the two responses shown in this table are the appearance of new lower-potential waves cathodic to the Au(O)/Au(I) couple in the ligand solution and/or a significant increase in current at this potential. The type of response depends on the type of ligand under study. Either response indicates an increase in the rate of gold dissolution and hence activation of the lixiviant system.

EXAMPLE 8

Effect of Heterocyclic Aromatic Compounds on Gold Electrodes in Cyanide Solution In this example the effect of a variety of heterocyclic aromatic compounds on the cyclic voltammetry of a gold electrode in a 0.1M KCN/0.1M KOH solution was determined. The gold electrode was a commercially available electrode that was polished with 6μ diamond paste, washed with deionized water and acetone, soaked in 30% hydrogen peroxide, and washed with deionized water prior to use. The KCN solution was thoroughly deaerated with nitrogen gas before the electrode was placed in the solution. Cyclic voltammograms were obtained with a BAS CV27 voltammograph (Bioanalytical Systems, Inc., 2701 Kent Avenue, West Lafayette, Ind. 47906), using a platinum wire counter electrode and a Ag/AgCl reference electrode. The gold electrode was conditioned by applying a potential (–800 mV relative to the Ag/AgCl electrode) for two minutes while stirring the solution with a magnetic stir bar. The cyclic voltammogram of the solution was then obtained on an unstirred solution, blanketed with nitrogen gas. The electrode conditioning was repeated. The heterocyclic aromatic compound was added at this point. The solution was stirred, generally for two minutes without the application of a potential; with the poorer activator compounds, a longer incubation period was necessary. The cyclic voltammogram of this solution was then recorded.

Table 5 lists the waves for KCN/KOH solutions with a variety of organic compounds. Activators are characterized by a wave in the –180 to –350 mV region (Peak 2) that is lacking in the KCN/KOH solutions without the activator. In some cases an additional wave is observed at lower potentials (ca. –600 mV). Unactivated KCN/KOH solutions alone show a wave in the +200 mV region.

TABLE 5

Peak Positions for Cyclic Voltammograms of Gold Electrode in 0.1 M KCN/0.1 M KOH

| Compound | Concentration (mM) | Peak 1 Position (mV) | Peak 2 Position (mV) | Peak 3 Position (mV) |
|---|---|---|---|---|
| 2-aminopyridine | 0.02 | –560 | –180 | 180 |
| 3-aminopyridine | 0.15 | –570 | –325 | 250 |
| 4-aminopyridine | 0.05 | –570 | –320 | 250 |
| 2,2'-dipyridyl | 0.1 | –560 | –320 | 210 |
| 4-t-butylpyridine | 0.2 | –620 | –260 | 100 |
| 2-chloropyridine | 0.1 | –590 | –220 | 150 |
| 2,4,6-collidine | 0.2 | –585 | –220 | 200 |
| 4-dimethylaminopyridine | 0.1 | –585 | –320 | 165 |
| 3-hydroxypyridine | 0.1 | –530 | –320 | 160 |
| 2,4-lutidine | 0.2 | –520 | –320 | 150 |
| 2,6-lutidine | 0.8 | –600 | –205 | 180 |
| 3,5-lutidine | 0.2 | –530 | –330 | 180 |
| nicotinamide | 0.3 | –530 | –320 | 150 |
| nicotinic acid | 0.2 | –570 | –350 | 110 |
| 2–phenylpyridine | 0.2 | –605 | –300 | 180 |
| pyrazole | 0.1 | –610 | –240 | 140 |
| 3,5-dimethylpyrazole | 0.2 | –480 | –160 (broad) | 235 |
| imidazole | 0.05 | –580 | –320 | 150 |
| 2,2'-bis(4,5-dimethylimidazole) | 0.2 | –560 | –200 | 160 |
| 4,5-dicyanoimidazole | 0.1 | –560 | –230 | 170 |
| 1,2-dimethylimidazole | 0.1 | –605 | –260 | 180 |
| N-methylimidazole | 0.3 | –580 | –330 | 120 |
| histidine ethyl ester | 0.3 | –590 | –330 | 165 |
| N-phenylimidazole | 0.1 | –550 | –240 | 0,230 |
| thiophene | 0.2 | –520 | –200 | 100 |
| 2-acetylthiophene | 0.1 | –540 | –240 | 190 |
| 3-bromothiophene | 0.2 | –540 | –230 | 150 |
| 3-thiopheheacetic acid | 0.07 | –600 | –230 | 200 |
| 2-thiophenecarboxylic acid | 0.2 | –560 | –220 | 150 |
| 3-thiophenecarboxylic acid | | | | |
| 2-aminothiazole | 0.2 | –570 | –320 | 100 |
| 3-amino-5,6-dimethyl-1,2,4-triazine | 0.1 | –590 | –170 | 110 |
| 2-amino-1,3,4-thiadiazole | 0.1 | –590 | –220 | 200 |
| 2,4,5-trimethyloxazole | 0.2 | –560 | –300 | 150 |
| trimethylpyrazine | 0.2 | –610 | –230 | 165 |
| benzimidazole | 0.1 | –560 | –220 | ~0 (broad) |
| benzothiazole | 0.5 | –540 | –250 | 180 |
| benzotriazole | 0.2 | –545 | –210 | 180 |
| quinoline | 0.2 | –480 | –250 | 60/250 |
| isoquinoline | 0.3 | –550 | –330 | 180 |

EXAMPLE 9

Effect of Sulfur Heterocycle Activator on Gold Electrode in Thiourea Solution

In this example, the effect of the activator 3-thiophenecarboxylic acid on the cyclic voltammogram of a gold electrode in an acidic thiourea solution is demonstrated. The electrochemical equipment described in Example 8 was used here, Water from a Barnstead Nanopure System (Barnstead Thermolyne Corporation, 2555 Kerper Boulevard, Dubuque, Iowa 52001, U.S.A.) was used to prepare solutions and to wash glassware and electrodes. A gold voltammetry electrode was used as the working electrode; a silver-silver chloride electrode and a platinum wire electrode were used as reference and counter electrodes; all indicated potentials are relative to silver-silver chloride. All electrodes were purchased from Bioanalytical Systems, Inc. (2701 Kent Avenue, West Lafayette, Ind. 47906, U.S.A.).

A 0.10M sodium sulfate solution was prepared by dissolving 0.710 g anhydrous sodium sulfate in approximately 40 mL water in a 50 mL beaker. The solution pH was adjusted to 2.5 with concentrated sulfuric acid. The solution was transferred to a 50 mL, volumetric flask and diluted to volume. This solution was used as the supporting electrolyte in the cyclic voltammetric study. A cyclic voltammogram was obtained over the potential range +0.400 V to −0.400 V; a sweep rate of 50 mV/sec was used throughout this Example. The initial potential was −0.20 V; the applied potential was swept in the anodic direction to 0.40 V, at which point the sweep was reversed to −0.400 V. No waves were observed.

To 10 mL of the supporting electrolyte solution in the electrochemical cell was added 0.076 g of thiourea to yield a 0.10M solution. A cyclic voltammogram was obtained over the region described above. An oxidation wave was observed at approximately +0.335 V; on reversal of the sweep direction, a reduction wave was observed at 0.00 V. These waves correspond to the oxidation of gold to form the gold-thiourea complex and reduction of the gold-thiourea complex to form metallic gold, respectively.

A 0.2M 3-thiophenecarboxylic acid solution was prepared by dissolving 0.380 g in 25 mL absolute ethanol.

To the thiourea solution in the electrochemical cell was added 2 μL of the ethanolic 3-thiophenecarboxylic acid solution described above. The solution was stirred for approximately 30 minutes. A cyclic voltammogram was obtained as described above. The current for both the oxidation wave and the reduction waves increased, indicating an increased dissolution of gold and reduction of gold-thiourea complex, respectively. Additional aliquots of ethanolic 3-thiophenecarboxylic acid solution were added to yield total additions of 4, 6, and 8 μL; solution concentrations thus ranged from 0.04–0.16 mM. After each addition, the solution was stirred for 15 to 30 minutes. A cyclic voltammogram was then obtained over the potential range indicated above. The current of both the oxidation waves and reductions increased over the activator concentration range 0.04 to 0.16 mM, indicating increase dissolution of gold in the activator solution.

EXAMPLE 10

Comparative Examples of Inactive Nitrogen and Sulfur Heterocyclic Aromatic Compounds This example demonstrates several nitrogen and sulfur heterocyclic aromatic compounds that do not activate gold dissolution reactions, using the procedures detailed above. In Table 6 the inactive compounds are listed along with the method used to test activity and the results obtained. Example 7 used cyclic voltammetry to demonstrate the appearance of a new oxidation wave cathodically shifted from that seen with the ligand alone. KCl was used as the ligand (solutions prepared as described above). No new wave was observed, which indicated inactivity of the compound. Example 8 used a 0.1M KCN/0.1M KOH solution to demonstrate activation of gold dissolution in a cyanide solution. Active compounds yield a new wave (Peak 2) cathodically shifted from that in KCN alone. The absence of this new wave indicates no activation of the gold dissolution reaction.

TABLE 6

Inactive Compounds Examined by Cyclic Voltammetry in KCl at pH 7 or KCN in 0.1 M KOH

| Compound | Method | Conditions | Result |
| --- | --- | --- | --- |
| 4,4'-dipyridyl | Example 8 | 0.2 mM | No Peak 2 |
| cyanuric acid | Example 7 | ~0.2 mM | Chloride wave at 1.2 V |
| cyanuric acid | Example 8 | ~0.2 mM | No Peak 2 |
| 1,5-dicyclohexylimidazole | Example 8 | 0.2 mM | No Peak 2 |
| 2,6-diphenylpyridine | Example 8 | 0.2 mM | No Peak 2 |
| 2-fluoropyridine | Example 8 | 0.3 mM | No Peak 2 |
| 2-hydroxypyridine | Example 8 | 0.2 mM | No Peak 2 |
| 4-hydroxypyridine | Example 8 | 0.2 mM | No Peak 2 |
| tetrabromothiophene | Example 8 | 0.1 mM | No Peak 2 |

What is claimed is:

1. A process for enhancing the dissolution of gold in a lixiviation system containing ligand and oxidant, comprising adding to said lixiviation system a catalytic amount of an aromatic heterocyclic compound containing a heteroatom selected from the group consisting of nitrogen and sulfur in the ring; provided that said heteroatom and the heterocyclic ring are available for coordination to the surface of the undissolved gold metal.

2. The process of claim 1 wherein the lixiviation system is cyanide ion with air or dissolved oxygen.

3. The process of claim 1 wherein the lixiviation system is chloride ion with sodium hypochlorite at pH 8–9.

4. The process of claim 1 wherein the lixiviation system is bromide ion with bromine.

5. The process of claim 1 wherein the lixiviation system is iodide ion with iodine.

6. The process of claim 1 wherein the lixiviation system is thiocyanate with ferric ions.

7. The process of claim 1 wherein the lixiviation system is thiourea with ferric ions.

8. The process of claim 1 wherein the lixiviation system is a thiosulfate anion with copper, ammonia, and air or dissolved oxygen.

9. The process of claim 1 wherein the lixiviation system is malononitrile with air or dissolved oxygen.

10. The process of claim 1 wherein the lixiviation system is cyanide, chloride, bromide, iodide, thiocyanate, thiosulfate, malononitrile, or thiourea in the presence of a gold electrode with an applied potential.

11. The process of claim 1 wherein the catalytic compound is an aromatic heterocycle with nitrogen and/or sulfur in the aromatic ring which, when tested in a 0.1M KCN/ 0.1M KOH solution containing a gold electrode, exhibits a voltametric wave in the region of about −180 to −350 mV.

12. The process of claim 1 wherein the catalytic compound is selected from the group consisting of:

| | |
| --- | --- |
| 2-(aminomethyl)pyridine | 4-phenylpyridine |
| 2-aminopyridine | 2-picoline |
| 3-aminopyridine | 3-picoline |
| 4-aminopyridine | 4-picoline |
| 2,2'-dipyr4-dyl | 2-propylpyridine |
| 4,4'-dipvridyl | 2,2'-pyridil |
| 2,2'-pyri.dylamine | pyridine |
| di-2-pyridvl ketone | 3-aminopyrazole |
| 4-t-butylpyridine | 3,5-dimethylpyrazole |
| 2-chloropyridine | 4-methylpyrazole |
| 2,4,6-collidine | 3-methylpyrazole |
| 4-dimethylaminopyridine | 1-phenylpyrazole |

| | |
|---|---|
| 2-ethylpyridine | pyrazole |
| 2-fluoropyridine | 1-(3-aminopropyl)imidazole |
| 2-(2-hydroxyethyl)pyridine | 2,2'-bis(4,5-dimethyl- |
| 2-hydroxypyridine | imidazole) |
| 2,3-lutidine | 4,5-dicyanoimidazole |
| 2,4-lutidine | 1,2-dimethylimidazole |
| 2,6-lutidine | 2-ethylimidazole |
| 3,5-lutidine | histamine |
| 2-methoxypyridine | histidine ethyl ester |
| nicotinamide | imidazole |
| nicotinic acid | N-methylimidazole |
| 2-phenylpyridine | 2-methylimidazole |
| 3-phenylpyridine | 4-methylimidazole |
| N-phenylimidazole | benzothiazole |
| 2-acetylthiophene | benzotriazole |
| 3-bromothiophene | isoquinoline |
| 2,5-dimethylthiophene | 1,10-phenanthroline |
| 2-methylthiophene | quinoline |
| 3-methylthiophene | 2-aminobenzimidazole |
| thiophene | 2-aminoimidazole |
| 3-thiopheneacetic acid | aminopyrazine |
| 2-thiophenecarboxylic acid | 2-aminopyrimidine |
| 3-thiophenecarboxylic acid | 2-amino-4,6-dimethyl- |
| 2-thiophenemethanol | pyrimidine |
| 2-aminothiazole | 2,6 diaminopyridine |
| 3-amino-5,6-dimethyl- | L-histidine |
| 1,2,4-triazine | DL-histidine |
| 2-amino-1,3,4-thiadiazole | pyrazine |
| 2,4,5-trimethyloxazole | tetramethylpyrazine |
| trimethylpyrazine | trimethylpyrazine |
| benzimidazole | |

13. The process of claim 1 wherein the catalytic compound is selected from the group consisting of imidazole, N-methylimidazole, benzimidazole, pyridine, picoline (2-, 3-, and 4-), lutidines (2,3-; 2,4-; 2,6-; 3,5-), collidine, quinoline, isoquinoline, thiophene, 3-thiophenecarboxylic acid, 3-thiopheneacetic acid, aminopyridine, 3-hydroxypyridine, dimethylaminopyridine, thiazole, methylthiazole, dimethylthiazole, pyrazine, 3-amino-5,6-dimethyl-1,2,4-triazine, pyrazole, 3,5-dimethylpyrazole, nicotinic acid, dicyanoimidazole, 2,4,5-trimethyloxazole, 2-amino-1,3,4-thiadiazole, L-histidine, and 2-aminopyrimidine.

14. The process of claim 2 wherein the pH of the system is about 9 or higher, the concentration of cyanide is about 10 mM or lower, and the catalytic compound is selected from the group consisting of imidazole, N-methylimidazole, 1,2-dimethylimidazole, pyridine, α-, β-, γ-picoline, 2-, 3-, 4-aminopyridine, 4-dimethylaminopyridine, thiophene, 3-thiophenecarboxylic acid, 3-thiopheneacetic acid, pyrazine, 2,4,6-trimethyltriazine, thiazole, L-histidine, and 2-aminopyrimidine.

15. The process of claim 3 wherein the pH of the system is about 8 to 9 and the catalytic compound is selected from the group consisting of pyridine, (α-, β-, γ-picoline, di-2-pyridyl ketone, 2,2'-dipyridyl, 3,5-lutidine, 2,6-lutidine, 2,3-lutidine, N-methylimidazole, L-histidine, and 2-aminopyrimidine.

16. The process of claim 4 wherein the pH of the system is about 9 or above, and the catalytic compound is selected from the group consisting of pyridine, α-, β-, γ-picoline, di-2-pyridyl ketone, 2,2'-dipyridyl, 3,5-lutidine, 2,6-lutidine, 2,3-lutidine and N-methylimidazole.

17. The process of claim 6 wherein the pH of the system is about 2 to 3.

18. The process of claim 8 wherein thiosulfate is present in the range 0.1–0.25M, copper(II) ion is present in the range 0.01–0.15M, ammonium ion (as thiosulfate, hydroxide and sulfate salts), is present in the range. 0.5–4.8M and the catalytic compound is selected from the group consisting of pyridine, (α-, β-, γ-picoline, di-2-pyridyl ketone, 2,2'-dipyridyl, 3,5-lutidine, 2,6-lutidine, 2,3-lutidine, imidazole, N-methylimidazole, thiophene, 3-thiophenecarboxylic acid, 3-thiopheneacetic acid, pyrazine, 2,4,6-trimethyltriazine, thiazole, L-histidine, and 2-aminopyrimidine.

19. The process of claim 9 wherein the pH of the system is about 10 to 12.

20. The process of claim 7 wherein the catalytic compound is 3-thiophenecarboxylic acid.

21. The process of claim 1 wherein the ligand and oxidant lixiviation system is chloride ion with sodium hypochlorite at pH 8–9, in the presence of a stablizer.

22. The process of claim 1 wherein the ligand and oxidant lixiviation system is bromide ion with bromine, in the presence of a stabilizer.

* * * * *

UNITED STATES PATENT AND TRADEMARK OFFICE
CERTIFICATE OF CORRECTION

PATENT NO. : 5,484,470
DATED : January 16, 1996
INVENTOR(S) : Sigridur S. Kristjansdottir, Jeffery S. Thompson It is certified that error appears in the above-identified patent and that said Letters Patent is hereby corrected as shown below:

Insert into Column 1, line 4 (after the Title) and, also, on the face of the patent, after item [22], the following:

-- Related U.S. Application Data

Continuation-in-Part of Serial No. 08/140,803 filed October 21, 1993 -- .

Signed and Sealed this

Twenty-fifth Day of February, 1997

Attest:

BRUCE LEHMAN

*Attesting Officer*         *Commissioner of Patents and Trademarks*